United States Patent
Ehlers et al.

(10) Patent No.: US 7,561,956 B2
(45) Date of Patent: Jul. 14, 2009

(54) METHOD FOR CONTROLLING BOOST PRESSURE IN AN INTERNAL COMBUSTION ENGINE

(75) Inventors: Guido Ehlers, Wettstetten (DE); Daniel Beese, Braunschweig (DE); Holger Braun, Gifhorn (DE); Stefan Linka, Gifhorn (DE)

(73) Assignee: Audi AG, Ingolstadt (DE)

( * ) Notice: Subject to any disclaimer, the term of this patent is extended or adjusted under 35 U.S.C. 154(b) by 57 days.

(21) Appl. No.: 11/826,632

(22) Filed: Jul. 17, 2007

(65) Prior Publication Data

US 2008/0059043 A1  Mar. 6, 2008

(30) Foreign Application Priority Data

Jul. 14, 2006 (DE) ............ 10 2006 032 835

(51) Int. Cl.
*F02D 41/14* (2006.01)
*F02D 28/00* (2006.01)

(52) U.S. Cl. ............ 701/102; 60/602
(58) Field of Classification Search ........ 701/101, 701/102, 114; 60/600–602; 123/564
See application file for complete search history.

(56) References Cited

U.S. PATENT DOCUMENTS 4,372,119 A * 2/1983 Gillbrand et al. ........ 60/600
6,644,029 B2 * 11/2003 Weinreuter ............ 60/602
6,681,573 B2 * 1/2004 Arnold .................. 60/602

FOREIGN PATENT DOCUMENTS

| DE | 19502150 | 5/1996 |
|----|----------|--------|
| DE | 19712861 | 10/1998 |
| DE | 19905420 | 8/2000 |
| DE | 10238573 | 3/2004 |
| JP | 3-141826 A * | 6/1991 |

* cited by examiner

*Primary Examiner*—Hieu T Vo
(74) *Attorney, Agent, or Firm*—Novak Druce & Quigg LLP

(57) ABSTRACT

Method for controlling boost pressure in an internal combustion engine, using a boost pressure control device by means of which from the control deviation between a setpoint boost pressure and an actual boost pressure a manipulated variable is generated which has a D portion supplied by a differential control unit or a damper, the D portion being adapted as a function of a control deviation of a transient effect detected and evaluated for a predetermined evaluation time period, wherein the D portion adaptation includes an operating point-dependent D portion depth adaptation and/or an operating point-dependent D portion time adaptation, whereby the output variable for the differential controller is adapted by the D portion depth adaptation, and the operating time of the D portion corresponding to predetermined boost pressure parameters, in particular characteristic map parameters, is adapted by the D portion time adaptation.

22 Claims, 4 Drawing Sheets

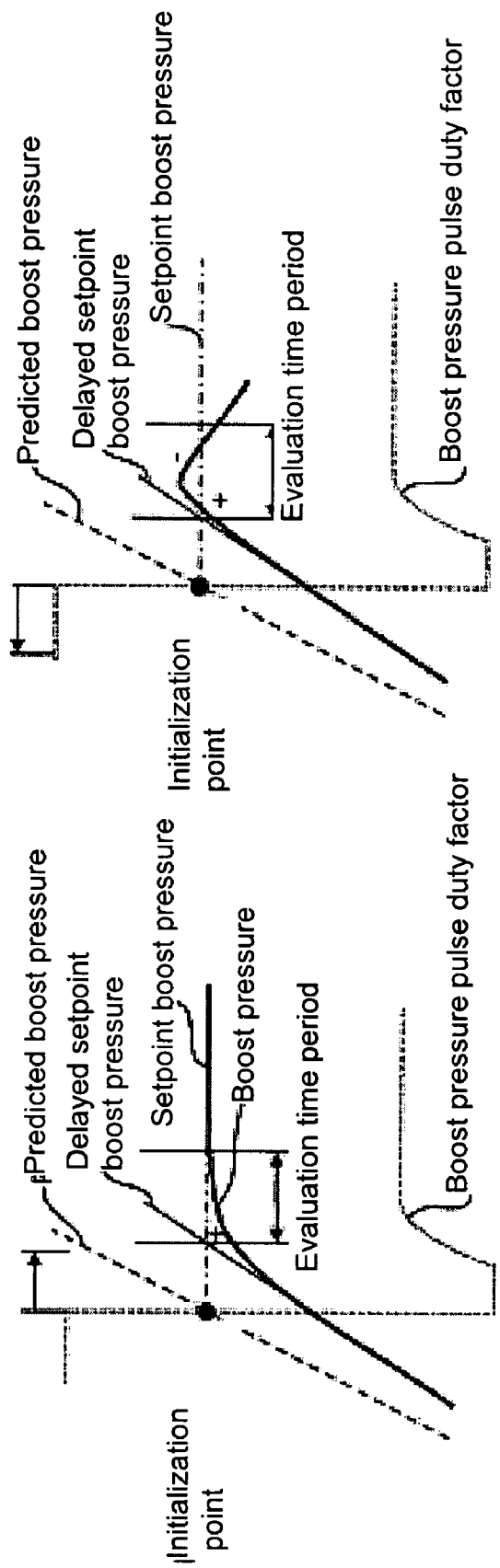

METHOD FOR CONTROLLING BOOST PRESSURE IN AN INTERNAL COMBUSTION ENGINE

The invention relates to a method for controlling boost pressure in an internal combustion engine.

BACKGROUND OF THE INVENTION

A generic boost pressure control system is known from DE 199 65 420 A1, which describes a method for boost pressure control in an internal combustion engine using a boost pressure control device, by means of which from the control deviation between a setpoint boost pressure and an actual boost pressure a manipulated variable is generated which has a D [differential] portion supplied by a differential control unit, the D portion being adapted as a function of a control deviation of a transient effect detected and evaluated for a predetermined evaluation time period. In this specific case, the output variable from the controller is reduced for an adjustment unit for the turbine blade as a function of the rate of control deviation between the boost pressure actual value and the boost pressure setpoint value; i.e., when the boost pressure actual value approaches the boost pressure setpoint value during acceleration, the adjustment variable for actuation of the adjustment unit for the turbine blades is reduced, specifically, at a rate that is greater the more rapid the boost pressure buildup.

In addition, from DE 197 12 861 A1 and DE 195 02 150 C1 it is known to specify a correction value for an integral portion of an integral action controller, the aim being to allow robust control of the supercharging of an internal combustion engine, in particular for cases in which extremely variable interfering parameters, such as greatly variable boost pressure setpoint values at full load, occur, or for extremely variable rotational speed dynamics.

Due to serial dispersion dictated by the manufacturing process, for example in the vicinity of a boost pressure control valve, such as in the vicinity of a spring-loaded pressure box which acts on a bypass valve, for some vehicles a different control characteristic is obtained which is undesirable. The same also applies to aging symptoms of components in the vicinity of the boost pressure control valve, which likewise may vary from vehicle to vehicle.

The object of the present invention, therefore, is to provide a method for controlling boost pressure in an internal combustion engine by means of which the aforementioned problems regarding serial dispersion and aging symptoms of the components of a controlled system, in particular for a boost pressure control valve, are avoided, and a high-quality and reproducible control may be provided with the lowest possible control deviation between the setpoint boost pressure and the actual boost pressure, as well as the best possible performance of the boost pressure buildup.

SUMMARY OF THE INVENTION

According to the invention, the D portion adaptation, performed in particular for adapting the boost pressure pulse duty factor for a boost pressure control valve, includes an operating point-dependent D portion depth adaptation, and, preferably in addition to and subsequent thereto, or as an alternative thereto, an operating point-dependent D portion time adaptation, whereby the output variable for the differential controller is adapted by means of the D portion depth adaptation and the operating time, specifically according to predetermined internal combustion engine or boost pressure parameters of the D portion, is adapted by means of the D portion time adaptation. The internal combustion engine or boost pressure parameters are preferably specified as characteristic map parameters, using characteristic maps or characteristic curves which have fixed values or which may also be adaptable.

By use of such a process, a system response which is consistent with respect to the control quality and reproducibility may be ensured over the series. In addition, the best possible performance of the boost pressure buildup may thus be obtained. This is because the operating point-dependent D portion depth adaptation or D portion time adaptation also enables such adaptation, in particular of the boost pressure pulse duty factor for a boost pressure valve, even when series dispersion and age symptoms of the components of a controlled system, in particular for a boost pressure valve, appear, such adaptation taking these phenomena into account at all times. In other words, by use of such an operating point-dependent adaptation routine for boost pressure control which acts on the boost pressure pulse duty factor it is possible to regulate the boost pressure with the lowest possible control deviation, for example by intervening in the damper portion in the form of the D portion, which is adapted as a function of the actual boost pressure curve, and within the scope of this adaptation continuously modified values are determined and stored if this is determined to be necessary. The D portion may be a conventional D portion of, for example, a PID controller, or also preferably a damper portion. The standard D portion of a PID controller results from the product of the derivation of the control deviation and the D portion parameter. The damper portion results from the product of the derivation of the actual value (in this case the boost pressure) and the damper parameter.

BRIEF DESCRIPTION OF THE DRAWINGS

FIG. 4 schematically shows the adaptation of the D portion operating time.

DETAILED DESCRIPTION OF AN EMBODIMENT OF THE INVENTION

Figure 1:
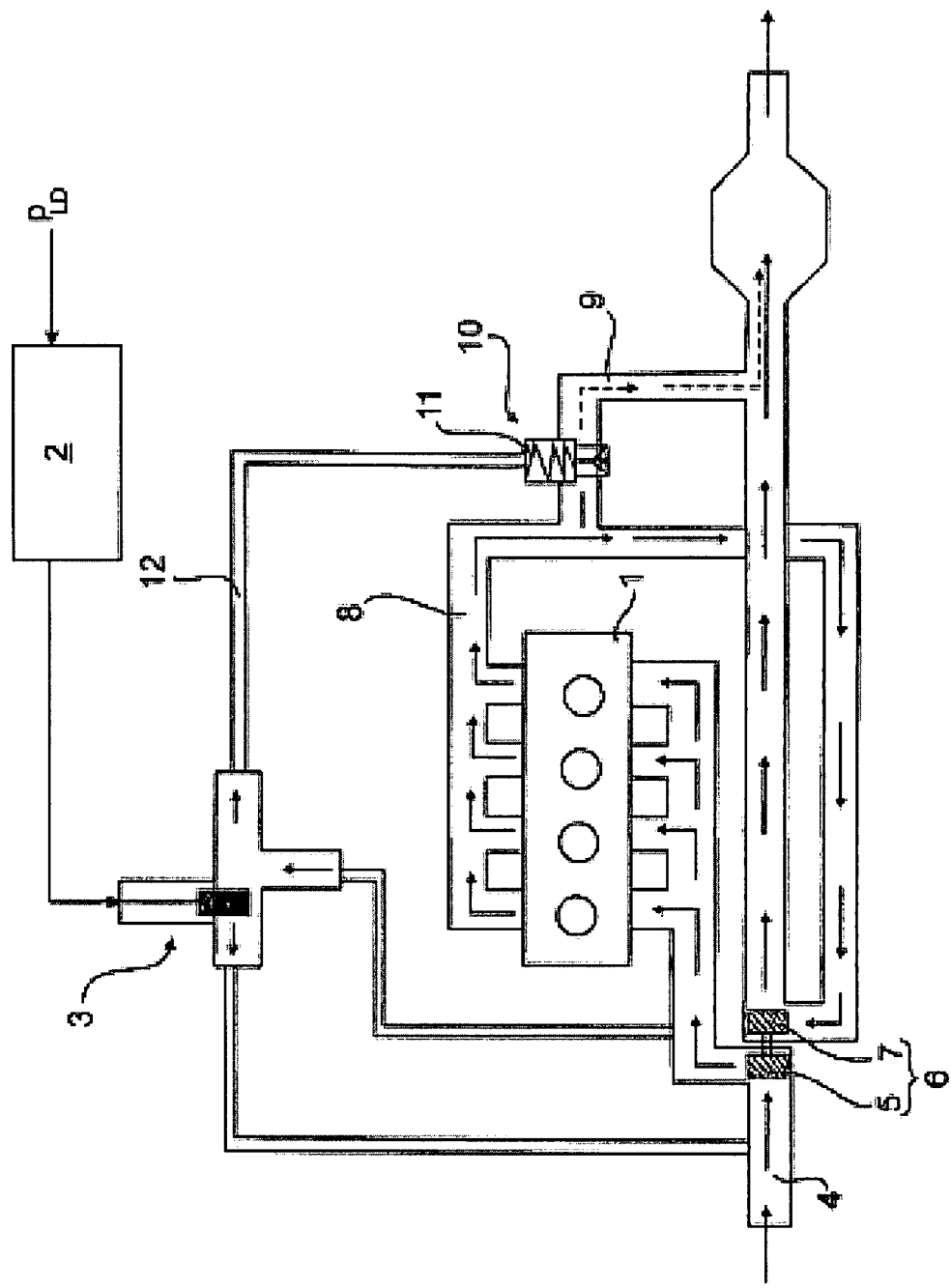
FIG. 1 schematically shows a diagram of an electronic boost pressure control system.

FIG. 1 schematically shows a diagram of an electronic boost pressure control system for an internal combustion engine 1 whose optimal boost pressure is controlled via a boost pressure control device 2 for the boost pressure control system. A pressure sensor, not illustrated here, detects the boost pressure and relays this information to the boost pressure control device 2, which in turn actuates a timing valve 3, the pulse duty factor of which controls the cross-sectional opening of the timing valve in a manner known as such.

As further shown in FIG. 1, the intake manifold 4 contains a compressor wheel 5 for an exhaust gas turbocharger 6, the turbine wheel 7 of which is located in the exhaust manifold 8. A bypass line 9 branches from the exhaust manifold 8 in the form of a waste gate, by means of which at least a portion of the exhaust gas flow may be introduced into the exhaust gas duct while bypassing the turbine wheel 7. For enabling of the bypass line 9, a boost pressure control valve or bypass valve 10 is provided which has a spring-loaded pressure box 11. As a function of the preferably electropneumatic timing valve 3, the pressure box may be acted on by a predetermined pressure value in the form of an actuating device setpoint value which is specified as a function of the operating point.

The basic operating mode is as follows: The engine control device computes a setpoint boost pressure at any point in time, based on the driver's request. On the basis of this setpoint boost pressure and the boost pressure measured downstream from the compressor 5, an actuating signal is computed for the timing valve 3, which is situated between the control line 12 to the waste gate pressure box 11 and the intake manifold 4, and also between the pressure line downstream from the compressor (see FIG. 1). If the boost pressure is increased corresponding to the setpoint boost pressure, as a result of actuation of the timing valve 3 the valve cross section between the control line 12 and the intake manifold 4 is continuously increased. This causes the pressure to drop in the waste gate [pressure] box 11, and the bypass valve 10 starts to close due to the spring pretensioning on the waste gate pressure box 11. This results in a continuous increase in the turbine mass flow, the converted power furnished to the compressor, and the boost pressure.

If the boost pressure is reduced according to the setpoint boost pressure, as a result of actuation of the timing valve 3 the valve cross section between the control line 12 and the intake manifold 4 is continuously decreased. This causes the pressure in the waste gate [pressure] box 11 to increase to a maximum value of the boost pressure, and the bypass valve 10 starts to open against the spring pretensioning on the waste gate pressure box 11. This results in a continuous decrease in the turbine mass flow, the converted power furnished to the compressor, and the boost pressure.

Figure 2:
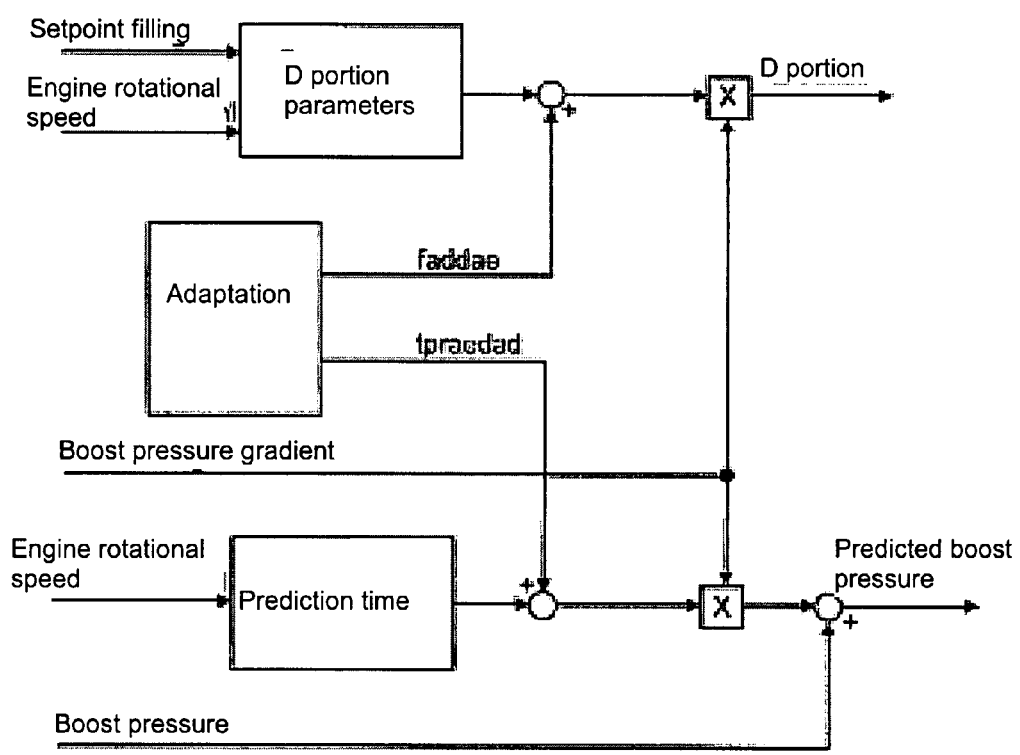
FIG. 2 shows the integration according to the invention of the D portion adaptation into a boost pressure control system.

In this case, the boost pressure control device 2 comprises a PID controller known as such (not illustrated) which generates a manipulated variable from the control deviation between the setpoint value boost pressure and the actual boost pressure, the manipulated variable having a D portion supplied by a differential controller (D controller) of the PID controller and preferably specified as a function of an engine rotational speed and/or a setpoint filling of the engine, as schematically illustrated in FIG. 2 as the D portion parameter, the aim being to prevent overshooting of the boost pressure during boost pressure buildup and thus to prevent excessive engine load. Alternatively, instead of a PID controller having an adaptable D portion a PI controller combined with an adaptable damper portion, or also a PID controller combined with an adaptable damper portion, may be used.

In addition to avoiding overshooting conditions, however, the boost pressure buildup should occur at the greatest possible speed. In order to ensure uniform system response that is constant over the series with regard to quality of control and reproducibility of the transient effect, therefore, adaptation of the D portion of the boost pressure control according to the invention is necessary.

Figure 3:
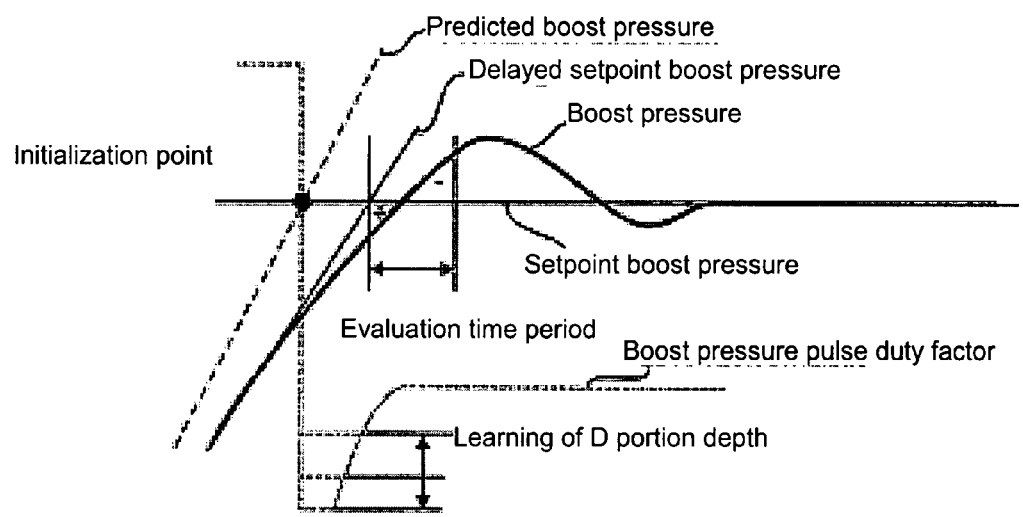
FIG. 3 schematically shows the adaptation of the D portion depth.

As further shown in FIG. 2, the D portion adaptation according to the invention is preferably divided into a D portion depth adaptation, for which the D portion determined from the setpoint filling and engine rotational speed is added to a correction value faddae, and a D portion time adaptation, by means of which a correction value tpraedad is determined which may result in a change to the predicted time and thus to the operating time of the D portion by the fact that the initialization time of the D portion is shifted. For this purpose, a predicted time determined as a function of the engine rotational speed and the initially specified operating time is adapted using the time adaptation value tpraedad, in this case by addition. The predicted boost pressure is then determined from the predicted or operating time in conjunction with the actual boost pressure, whereby a change in the predicted time results in an increase in the predicted boost pressure (see the diagrams in FIG. 3 and FIGS. 4a and 4b), thereby shifting the initialization time of the D portion. The initialization time of the D portion in FIGS. 3, 4a, and 4b is thus described by the intersection of the predicted boost pressure with the setpoint boost pressure.

The adapted values of the D portion depth adaptation and the D portion time adaptation are stored in nonvolatile memory arrays whose addressing variable is the engine rotational speed nmot, to be discussed in greater detail below.

The adaptation of the D portion is enabled for load jumps into full load mode over the entire range of the engine rotational speed nmot. The adapted values are computed after a predetermined time has elapsed after the transient effect or the evaluation time has ended, likewise to be discussed in greater detail below. If an evaluation has been started, the next evaluation cannot be activated until the predetermined evaluation time has elapsed.

For the assignment and reading of values of an adaptation array (memory array), whole-number indices are required for addressing the individual array elements. Such indices describe the adjacent array elements for the instantaneous nmot working point. The indices for the array axis are always determined from the instantaneous value of nmot. The assignment of a particular value range of nmot to particular indices may be determined by use of a predetermined table, for example a characteristic curve using "rounding" as the interpolation method.

A fixed engine rotational speed or nmot value corresponding to the instantaneous indices is also computed during index determination. These values are used, among other purposes, for reading the adapted values faddae and tpraedad by linear interpolation.

To evaluate the transient effect for the boost pressure after a jump to full load, an evaluation time period is defined in which the effects of the D portion, previously impressed on the manipulated variable (boost pressure pulse duty factor ldtvm), on the boost pressure may be evaluated. The evaluation time period starts at the intersection of the delayed setpoint boost pressure representing the one reference pressure with the setpoint boost pressure itself, and ends after a predetermined time has elapsed (see FIG. 3). The delayed setpoint boost pressure represents the quickest possible boost pressure buildup as a function of the operating point and the vehicle, and is obtained according to the following rule until the setpoint boost pressure is attained:

$$\dot{p}_{max}(k)=\max[\dot{p}_{max}(k-1), \dot{p}vd(k)]$$

$$p(k)=\dot{p}_{max}(k)*\Delta t+pvd$$

where pvd is the boost pressure, $\dot{p}_{max}$ is the largest boost pressure increase occurring during the load jump, $\Delta t$ is the computed increment, and p is the delayed setpoint boost pressure.

The delayed setpoint boost pressure thus represents the reference pressure for optimizing the transient effect; i.e., the criteria for adapting the D portion parameter (D portion depth) and the predicted time (D initialization time) are derived from this progression.

During the evaluation time period the instantaneous control deviation, i.e., the difference in the setpoint boost pressure and the actual boost pressure, is summed and divided by the time already elapsed. The average control deviation dpvdkm is computed in this manner. When the boost pressure intersects with the setpoint boost pressure during the evaluation time period (overshooting of the boost pressure), the previously determined positive average control deviation in the variables dpvdkms is placed in intermediate storage. The variable dpvdkm is then reset and used for the remainder of the evaluation time period for storing the average control deviation of the negative overshoot portion.

On the other hand, if the boost pressure never reaches the setpoint boost pressure during the evaluation time period, i.e., an asymptotic transient effect is present, only the variable dpvdkm exists. The computation of the average control deviation is abbreviated when the pressure overshoots during the evaluation time period and subsequently undershoots. In this case only the overshoot portion is evaluated.

The average control deviations thus determined during the transient effect are used for computing the change values for the D portion depth adaptation (correction value for the D portion parameter) and for the D portion time adaptation (correction value for the operational or predicted time).

For computing a depth adaptation change value dfdae, for an overshooting boost pressure curve as illustrated in FIG. 3 the absolute ratio of the average positive and negative control deviations is determined. By use of this ratio, a decision is made as to whether the negative or positive average control deviation should be entered in the computation of the depth adaptation change value dfdae. As long as the ratio is greater than a specifiable threshold value, only the negative average control deviation in used, whereas the positive average control deviation is ignored. However, if the ratio is smaller, only the positive average control deviation is used. Based on the positive or negative average control deviation thus determined, the depth adaptation change value dfdae may then be determined by use of a predetermined amplification characteristic curve. The depth adaptation change value dfdae is subsequently weighted in a specified manner and added to the adjacent rotational speed interpolation points in the adaptation array. This results in a linear distribution of the depth adaptation change value as a function of the distance of the operating point from the adjacent rotational speed interpolation points at the time of the D portion initialization. Thus, as schematically illustrated in FIG. 3, by use of this D portion depth adaptation the D portion depth may be learned or adapted for the boost pressure or boost pressure pulse duty factor. Adaptation of the D portion depth is arrested with respect to adaptation of the D portion operational or predicted time, to be described in greater detail below. In other words, the depth is adapted first for a working point. When the value of the sum of the positive average control deviation and the negative average control deviation is less than a predetermined threshold, the D portion time adaptation is initiated.

In this case, computation of the time adaptation change value dptr for the D portion time adaptation is enabled, so that a predetermined, previously specified length of the operating time of the D portion is compared to a predetermined setpoint operating time. If the detected D portion operating time is less than the setpoint operating time, a positive time adaptation change value dtpr is determined by use of this deviation and a specified amplification characteristic curve, resulting in an earlier initialization time for the D portion and thus, a longer operating time for the D portion (see FIG. 4b).

On the other hand, if the operation time of the D portion is greater than the setpoint operating time, the predicted time is reduced over the time adaptation change value dtpr, thereby shortening the operation time of the D portion (see FIG. 4a). In this case the time adaptation change value dtpr is determined from the positive average control deviation dpvdkms and a predetermined amplification characteristic curve. The weighted writing of the time adaptation change value dtpr into the associated time adaptation array takes place in an analogous manner to writing of the depth adaptation change value dfdae for the D portion depth adaptation.

Both adaptation values faddae and tpraedad may then also be read in parallel, for example, from the adaptation array for the D portion depth and time adaptation, using linear interpolation, as a function of the instantaneous engine rotational speed nmot.

The invention claimed is:

1. Method for controlling boost pressure in an internal combustion engine, using a boost pressure control device by means of which from the control deviation between a setpoint boost pressure and an actual boost pressure a manipulated variable is generated which has a D portion supplied by a differential control unit or a damper, the D portion being adapted as a function of a control deviation of a transient effect detected and evaluated for a predetermined evaluation time period, wherein the D portion adaptation, performed in particular for adapting the boost pressure pulse duty factor (ldtvm) for a boost pressure control valve, includes an operating point-dependent D portion depth adaptation and/or an operating point-dependent D portion time adaptation, whereby the output variable for the differential controller is adapted by the D portion depth adaptation, and the operating time of the D portion corresponding to predetermined boost pressure parameters, in particular characteristic map parameters, is adapted by the D portion time adaptation.

2. Method according to claim 1 wherein the adaptation of the D portion is enabled for load jumps into full load mode over the entire range of the engine rotational speed.

3. Method according to claim 1 wherein the evaluation time period is specified as a function of a reference pressure (delayed boost pressure) which represents the briefest possible, i.e., most rapid, boost pressure buildup.

4. Method according to claim 3 wherein the start of the evaluation time period is set in such a way that at this point in time the value of the setpoint boost pressure corresponds to the value of the reference pressure.

5. Method according to claim 3 wherein the reference pressure until the setpoint boost pressure is achieved is obtained from the following equation:

$$\dot{p}_{max}(k)=\max[\dot{p}_{max}(k-1),\dot{p}vd(k)]$$

$$p(k)=\dot{p}_{max}(k)*\Delta t+pvd$$

where pvd is the boost pressure, $\dot{p}$max is the largest boost pressure increase occurring during the load jump, $\Delta t$ is the computed increment, and p is the reference pressure.

6. Method according to claim 5 wherein the depth adaptation change value (dfdae) is determined on the basis of the selected average positive or average negative control deviation over a specified amplification characteristic curve for the depth adaptation change value (dfdae), which then is preferably weighted in a specified manner and added to the adjacent rotational speed interpolation points in the depth adaptation array, from which a depth adaptation value (faddae) is read, preferably by linear interpolation, as a function of the instantaneous engine rotational speed (nmot).

7. Method according to claim 6 wherein the depth adaptation value and/or the time adaptation value of the D portion are stored in nonvolatile memory arrays, the assignment and reading of values being performed using whole-number indices for addressing the individual array elements, the indices for the array axis always being determined from the instantaneous value of the engine rotational speed (nmot), the assignment of the indices to the engine rotational speed value ranges being made by use of predetermined characteristic curves, and in the index determination a fixed value for the engine rotational speed being computed corresponding to the instantaneous indices.

8. Method according to claim 1 wherein a control deviation (dpvdkm) averaged over the evaluation time period is determined as the control deviation for a D portion depth adaptation.

9. Method according to claim 8 wherein for determining the average control deviation (dpvdkm) during the evaluation time period the instantaneous control deviation is summed and divided by the time already elapsed, whereby the value of the average control deviation in which the instantaneous boost pressure exceeds the setpoint boost pressure during this evaluation time period is placed in intermediate storage in an intermediate memory as a positive control deviation (dpvdkms), and after the intermediate storage such a positive average control deviation (dpvdkms) resets the average control deviation (dpvdkm), and a negative average control deviation for an overshoot portion is then detected and determined for the remainder of the evaluation time period, whereas for the case in which the boost pressure never reaches the setpoint boost pressure during the evaluation time period (asymptotic transient effect), only the average control deviation (dpvdkm) is determined and is present as a value, and from a value of the average control deviations thus determined a depth adaptation change value is specified for the D portion depth adaptation.

10. Method according to claim 9 wherein for an overshooting boost pressure curve, the depth adaptation change value (dfdae) for the D portion depth is determined by evaluation and comparison of the average control deviation to the positive average control deviation (dpvdkms).

11. Method according to claim 10 wherein in the case of a ratio value that is greater than a specified comparative value, only the negative average control deviation is used for determining the depth adaptation change value, and in the case of a ratio value that is less than a specified comparative value, only the positive average control deviation is used for determining the depth adaptation change value.

12. Method according to claim 8 wherein a D portion time adaptation is started after the D portion depth adaptation, preferably under the condition that the value of the sum of the average control deviation (dpvdkm) and the positive average control deviation (dpvdkms) in the evaluation time period is less than a predetermined threshold value.

13. Method according to claim 1 wherein for a D portion time adaptation an operating time period of the D portion, determined by means of a detection device, is compared to a predetermined setpoint operating time, and in the case of a deviation of the setpoint operating time from the detected operating time period of the D portion specified parameters are correspondingly adapted, and in particular an initialization time for the D portion is modified.

14. Method according to claim 13 wherein in the case of a D portion operating time period that is less than a predetermined setpoint operating time period, a time adaptation change value (dtpr) corresponding to a predetermined parameter, in particular a characteristic map parameter, is determined and specified, resulting in an initialization time for the D portion that is earlier than an instantaneous initialization time, and in the case of a D portion operating time period that is greater than a predetermined setpoint operating time period, a time adaptation change value (dtpr) corresponding to a predetermined parameter, in particular a characteristic map parameter, is determined and specified, resulting in an initialization time for the D portion that is later than an instantaneous initialization time.

15. Method according to claim 14 wherein, the time adaptation change value (dtpr) is specified by use of a predetermined amplification line and/or as a function of the value of the average, the negative average, or the positive average control deviation.

16. Method according to claim 13 wherein time adaptation change value (dtpr) is preferably weighted in a specified manner and added to the adjacent rotational speed interpolation points in a time adaptation array, from which a time adaptation value (tpraedad) is read, preferably by linear interpolation, as a function of the instantaneous engine rotational speed (nmot).

17. Method according to claim 1 wherein the initialization time for the D portion is determined as a function of the setpoint boost pressure and a predicted boost pressure, the predicted boost pressure preferably being computed or predicted as a function of an operating point-dependent engine rotational speed (nmot).

18. Method according to claim 1 wherein the adapted D portion is impressed on the boost pressure pulse duty factor (ldtvm) for a boost pressure control valve.

19. Method according to claim-1 wherein the boost pressure control device has a PD or PID controller which supplies the adaptable D portion.

20. Method according to claim 1 wherein the boost pressure control device has a damper which supplies the adaptable D portion with which a PI or PID controller is associated.

21. Method according to claim 1 wherein the D portion to be adapted is specified as a function of an engine rotational speed (nmot) and/or a setpoint filling rate of the engine.

22. Boost pressure control device for carrying out a method according to claim 1.

* * * * *

UNITED STATES PATENT AND TRADEMARK OFFICE
CERTIFICATE OF CORRECTION

PATENT NO. : 7,561,956 B2 Page 1 of 1
APPLICATION NO. : 11/826632
DATED : July 14, 2009
INVENTOR(S) : Ehlers et al.

It is certified that error appears in the above-identified patent and that said Letters Patent is hereby corrected as shown below:

Col. 6, line 51 replace "At" with --$\Delta t$--

Signed and Sealed this

Thirteenth Day of July, 2010

David J. Kappos
*Director of the United States Patent and Trademark Office*